(12) United States Patent
Yamanouchi

(10) Patent No.: US 6,570,741 B2
(45) Date of Patent: May 27, 2003

(54) LOAD/UNLOAD MECHANISM STABLY HOLDING HEAD SLIDER IN RECORDING DISK DRIVE

(75) Inventor: Hidetake Yamanouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 09/726,850

(22) Filed: Nov. 30, 2000

(65) Prior Publication Data

US 2001/0043441 A1 Nov. 22, 2001

(30) Foreign Application Priority Data

May 22, 2000 (JP) ........................................ 2000-150383

(51) Int. Cl.⁷ .............................. G11B 21/22; G11B 5/54
(52) U.S. Cl. .................................................. 360/254.4
(58) Field of Search .......................... 360/254.3, 254.4, 360/254.5, 254.6, 254.2, 254.1, 254, 250, 240, 254.8

(56) References Cited

U.S. PATENT DOCUMENTS

| | | | |
|---|---|---|---|
| 3,984,873 A | * 10/1976 | Pejcha ...................... | 360/254.3 |
| 5,274,519 A | * 12/1993 | Saito et al. ............... | 360/254.3 |
| 5,526,206 A | * 6/1996 | Shimizu ................... | 360/254.8 |
| 6,028,745 A | * 2/2000 | Nguyen et al. ........... | 360/254.3 |
| 6,344,950 B1 | * 2/2002 | Watson et al. ........... | 360/254.3 |
| 2001/0033459 A1 | * 10/2001 | Boutaghou ................ | 360/254.3 |

FOREIGN PATENT DOCUMENTS

JP 410241310 A * 9/1998

* cited by examiner

Primary Examiner—William Klimowicz
Assistant Examiner—Julie Anne Watko
(74) Attorney, Agent, or Firm—Greer, Burns & Crain, Ltd.

(57) ABSTRACT

A load/unload mechanism includes a load bar fixed to the tip end of a head suspension and a ramp member. When a recording disk stands still, a swinging arm swings to reach a standby position. The load bar is received on the ramp member, while the head suspension is connected to a suspension holding member. The load bar serves to keep the head suspension distanced away from a recording disk. If any hard impact acts on the recording disk drive from the outside, the load bar received on the ramp member inevitably suffers from a relatively larger displacement. On the other hand, the magnitude of displacement can be suppressed at the head suspension which is located nearer to the swinging arm as compared with the load bar. It is possible to reliably prevent release of the connection between the head suspension and the suspension holding member. A stable connection between the head suspension and the suspension holding member in this manner serves to reliably keep the load bar on the ramp member even when a hard impact acts on the recording disk drive from the outside.

2 Claims, 10 Drawing Sheets

LOAD/UNLOAD MECHANISM STABLY HOLDING HEAD SLIDER IN RECORDING DISK DRIVE

BACKGROUND OF THE INVENTION

1. Field of the Invention

The present invention relates to a recording disk drive incorporating a so-called load/unload mechanism designed to hold a head slider above the surface of a recording disk. The recording disk drive may be represented by a magnetic recording disk drive such as a hard disk drive (HDD).

2. Description of the Prior Art

For example, a load/unload mechanism incorporated in a hard disk drive (HDD) may include a load bar fixed at the tip end of a head suspension so as to extend forward from the head suspension, and a ramp member located outside the outer periphery of a magnetic recording disk or hard disk. The ramp member is designed to receive the load bar when the magnetic recording disk stands still. When the load bar is supported on the ramp member, a head slider at the tip end of the head suspension is kept away from the surface of the magnetic recording disk even when the magnetic recording disk stands still.

A conventional load/unload mechanism involuntarily allows a drop of the load bar from the ramp member if a hard impact acts on the HDD. If the load bar is caused to fall off from the ramp bar in this manner, the head slider inevitably contacts the surface of the magnetic recording disk. An adsorption acts on the head slider from a lubricating agent or oil spreading over the surface of the magnetic recording disk. Such adsorption hinders the rotation of the magnetic recording disk. In this situation, the magnetic recording disk cannot even start rotating.

In general, the head slider is released from the support by the load/unload mechanism at a specific position above the surface of the magnetic recording disk. A marginal area, not applicable to recordation of data, is preferably defined on the surface of the magnetic recording disk below the specific position of the head slider. In the case where the head slider takes off at the specific position outside the outermost recording track in a conventional manner, the marginal area of a predetermined width should be defined outside the outermost recording track. If the marginal area can be transferred to the inner area around the rotational axis of the magnetic recording disk, the data area can be expanded or enlarged on the surface of the magnetic recording disk.

SUMMARY OF THE INVENTION

It is accordingly an object of the present invention to provide a load/unload mechanism capable of stably keeping the connection between a ramp member and a head suspension when a recording disk stands still. It is another object of the present invention to provide a load/unload mechanism capable of reducing a marginal area, not applicable to recordation of data, on the surface of a recording disk so as to contribute to an efficient utilization of a limited area over the recording disk.

According to a first aspect of the present invention, there is provided a recording disk drive comprising: a swinging arm designed to swing around a support shaft from a standby position; a head suspension attached to an end of the swinging arm so as to extend forward from the swinging arm; a load bar attached to an end of the head suspension so as to extend forward from the head suspension; a ramp member designed to receive the load bar when the swinging arm swings toward the standby position; and a suspension holding member connected to the head suspension when the swinging arm reaches the standby position.

A combination of the load bar and the ramp member serves to establish a load/unload mechanism in the recording disk drive. The load/unload mechanism allows the load bar to be held on the ramp member when the recording disk stands still. The load bar serves to keep the head suspension distanced away from a recording disk.

In general, the head suspension is allowed to swing in the vertical direction about the tip end of the swinging arm. The amplitude of displacement gets larger at a location remoter from the swinging arm. If any hard impact acts on the recording disk drive from the outside, the load bar received on the ramp member inevitably suffers from a relatively larger displacement. On the other hand, the magnitude of displacement can be suppressed at the head suspension which is located nearer to the swinging arm as compared with the load bar. If the head suspension is coupled to the suspension holding member, it is possible to reliably prevent release of the connection between the head suspension and the suspension holding member. A stable connection between the head suspension and the suspension holding member in this manner serves to reliably keep the load bar on the ramp member even when a hard impact acts on the recording disk drive from the outside.

In this type of the recording disk drive, a ramp member for a load/unload mechanism may comprise: a slant designed to receive a load bar extending forward from an end of a head suspension; and a suspension holding member connected to the head suspension when the slant receives the load bar, for example. In this case, a unitary member can be provided to comprise a slide defining the slant and the suspension holding member. The unitary member may be made from a hard plastic material such as an engineering plastic.

According to a second aspect of the present invention, there is provided a recording disk drive comprising: a recording disk rotating around a rotational axis; a head slider supporting a head element and designed to move across the recording disk in a radial direction thereof; a head suspension supporting the head slider; a swinging arm supporting the head suspension and designed to cause the head slider to move in the radial direction of the recording disk; and a ramp member extending in the radial direction of the recording disk so as to cross a data area on the recording disk.

The recording disk drive allows the ramp member to support the head suspension above the recording disk as long as the head slider is located at a position above the data area. It is possible to reliably prevent the head slider from contacting or colliding against the recording disk. Even when any hard impact acts on the recording disk drive, the head suspension is reliably prevented from falling off from the ramp member. The head suspension may be supported directly on the ramp member. Alternatively, the head suspension may be supported on the ramp member through a load bar fixed at the tip end of the head suspension.

The recording disk drive of the second aspect may further comprise: an inner slant defined on the ramp member and designed to receive a load bar carried on the head suspension when the head slider takes an innermost effective flying position; and an outer slant defined on the ramp member and designed to receive the load bar when the head slider takes an outermost effective flying position, for example.

In general, a marginal area, not applicable to recordation of data, is preferably defined on the surface of a recording disk below a specific position at which a head slider takes off a ramp member in a load/unload mechanism, since there is a probability in which the head slider involuntarily collides against the surface of the recording disk after taking off the ramp member. The collision may induce a damage on the head slider, and/or generation of a scar or loss of a recorded information on the recording disk. In the case where the head slider takes off from the outer slant, the marginal area of a predetermined width should be defined over the outer peripheral area on the recording disk.

As conventionally known, a longer recording track can be defined on the surface of the recording disk at an outer position rather than at an inner position. In other words, a larger quantity of data can be recorded on the recording disk along an outer recording track rather than an inner recording track. Since the recording disk drive of the aforementioned type allows the head slider to take off the ramp member at the inner slant, the marginal area of a predetermined width should be defined over the inner area around the rotational axis of the recording disk. It is not necessary to define a marginal area of the predetermine width over the outer peripheral area on the recording disk. Specifically, it is possible to reduce the marginal area, not applicable to recordation of data, as compared with the case where the marginal area should be defined over the outer peripheral area. Accordingly, a limited area over the recording disk can be utilized in an efficient manner.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
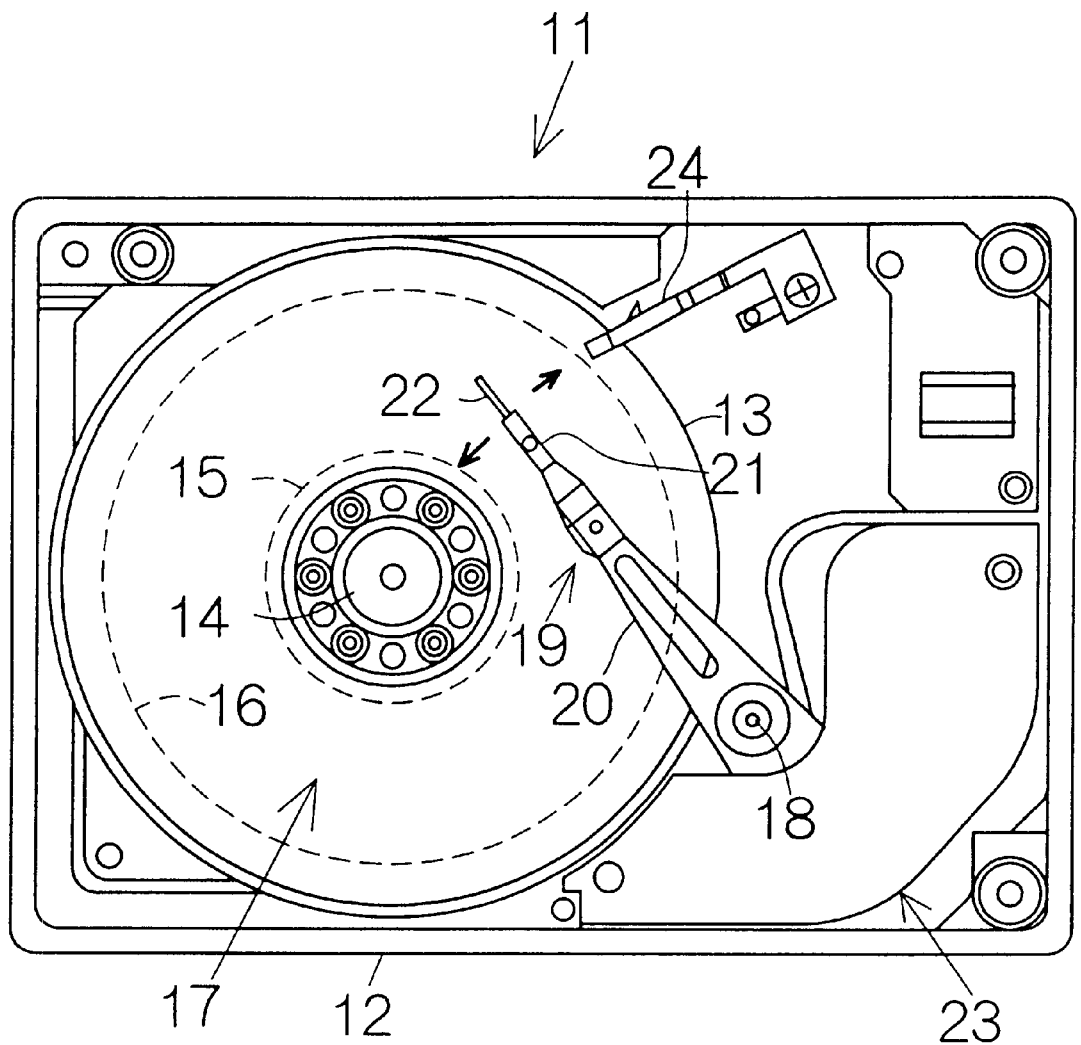
FIG. 1 is a plan view schematically illustrating the inner structure of a hard disk drive (HDD) according to a first embodiment of the present invention.

FIG. 1 schematically illustrates the inner structure of a hard disk drive (HDD) 11 as an example of a recording disk drive according to a first embodiment of the present invention. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A data area 17 is defined on the surface of the magnetic recording disk 13 between an innermost recording track 15 and an outermost recording track 16. A plurality of concentric recording tracks are defined over the data area 17, as conventionally known. A marginal area inside the innermost recording track 15 as well as a marginal area outside the outermost recording track 16 is designed to receive no information data. Specifically, no recordation of an information data is intended over the marginal areas.

A carriage 19 is also incorporated within the inner space or primary enclosure 12. The carriage 19 is allowed to swing around a vertical support shaft 18. The carriage 19 include a rigid swinging arm 20 extending in a horizontal direction from the support shaft 18, and an elastic head suspension 21 fixed at the tip end of the swinging arm 20 so as to extend forward from the swinging arm 20. When the swinging arm 20 swings around the support shaft 18, the tip end of the head suspension 21 is allowed to move across the data area 17 between the innermost and outermost recording tracks 15, 16. When the swinging arm 20 is positioned at a standby position, the tip end of the head suspension 21 reaches a position outside the outer periphery of the magnetic recording disk 13 beyond the outermost recording track 16. An actuator 23 such as a voice coil motor (VCM) may be employed to realize the swinging movement of the carriage 19. As conventionally known, in the case where two or more magnetic recording disks 13 are incorporated in the primary enclosure 12, a pair of the head suspensions 21 are attached to the common single swinging arm 20 between the adjacent magnetic recording disks 13.

An elongated member or load bar 22 is fixed at the tip end of the head suspension 21 so as to extend forward from the head suspension 21. The load bar 22 is allowed to move in the radial direction of the magnetic recording disk 13 with the assistance of the swinging movement of the carriage 19. A ramp member 24 is located on a path of movement of the load bar 22 outside the outer periphery of the magnetic recording disk 13. When the swinging arm 20 is driven to swing toward the standby position, the ramp member 24 is allowed to receive the load bar 22.

Figure 2:
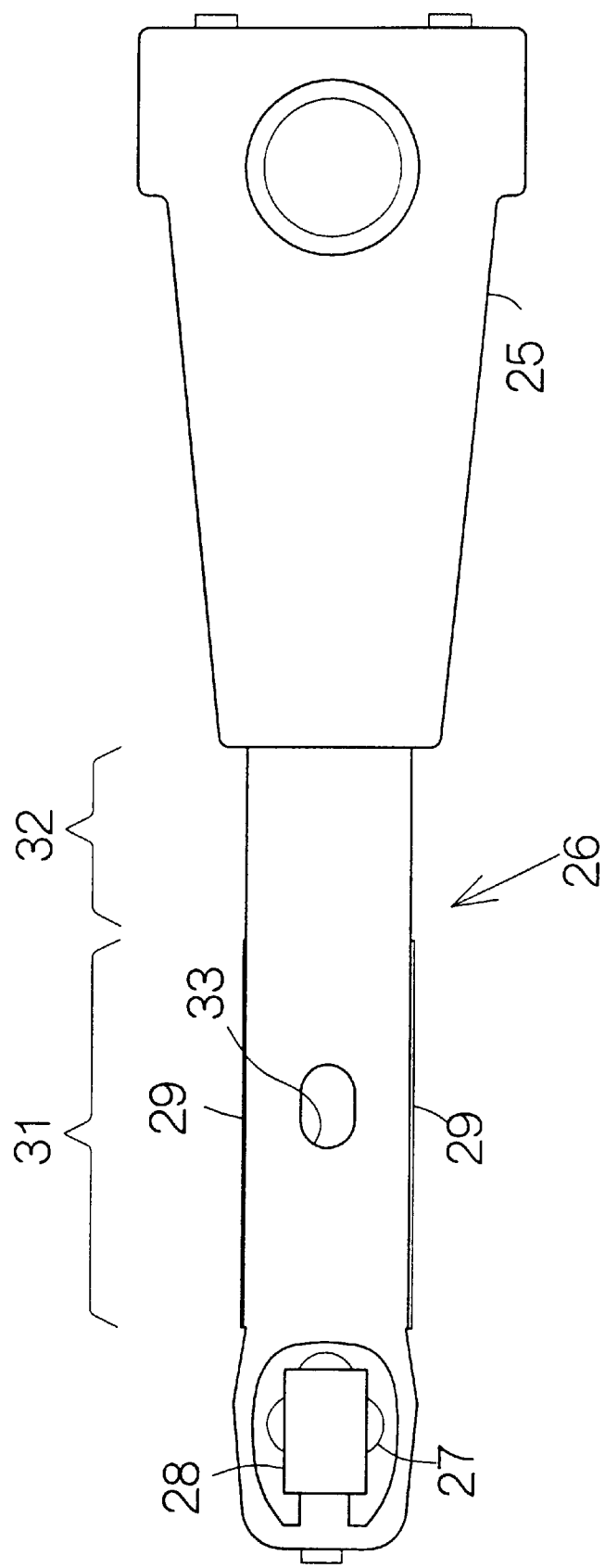
FIG. 2 is an enlarged plan view schematically illustrating the structure of a head suspension.

As shown in FIG. 2, the head suspension 21 includes a fixation plate 25 fixed on the tip end of the swinging arm 20, and a plate-shaped main body 26 extending forward from the fixation plate 25. A so-called gimbal spring 27 is integrally formed at the tip end of the main body 26. The head suspension 21 may be formed or shaped out of a single stainless plate, for example.

A flying head slider 28 is fixed on the gimbal spring 27. The flying head slider is designed to receive an electromagnetic transducer, not shown, such as a thin film magnetic head, for writing a magnetic information data into the magnetic recording disk 13 as well as an electromagnetic transducer, not shown, such as a giant magneto resistive (GMR) element and a tunnel-junction magneto resistive (TMR) element, for reading a magnetic information data out of the magnetic recording disk 13.

A pair of folded pieces 29 are integrally formed on the main body 26 so as to extend from the fixation plate 25 toward the gimbal spring 27 in a longitudinal direction of the main body 26. The folded piece 26 is designed to stand at the edge of the main body 26 so as to reinforce the rigidity of the main body along the longitudinal direction. A high rigidity section 31 is thus defined on the main body 26 between the folded pieces 29. A flexible section 32 is also defined on the main body 26 between the high rigidity section 31 and the fixation plate 25. The flexible section 32 is designed to allow the high rigidity section 31 to swing relative to the fixation plate 25. The folded pieces 29 may be obtained by simply folding a stainless plate at the opposite edges of the main body 26.

A bore 33 is defined in the main body 26 at the high rigidity section 31. This bore 33 is preferably located at a position nearest to the flexible section 32.

Figure 3:
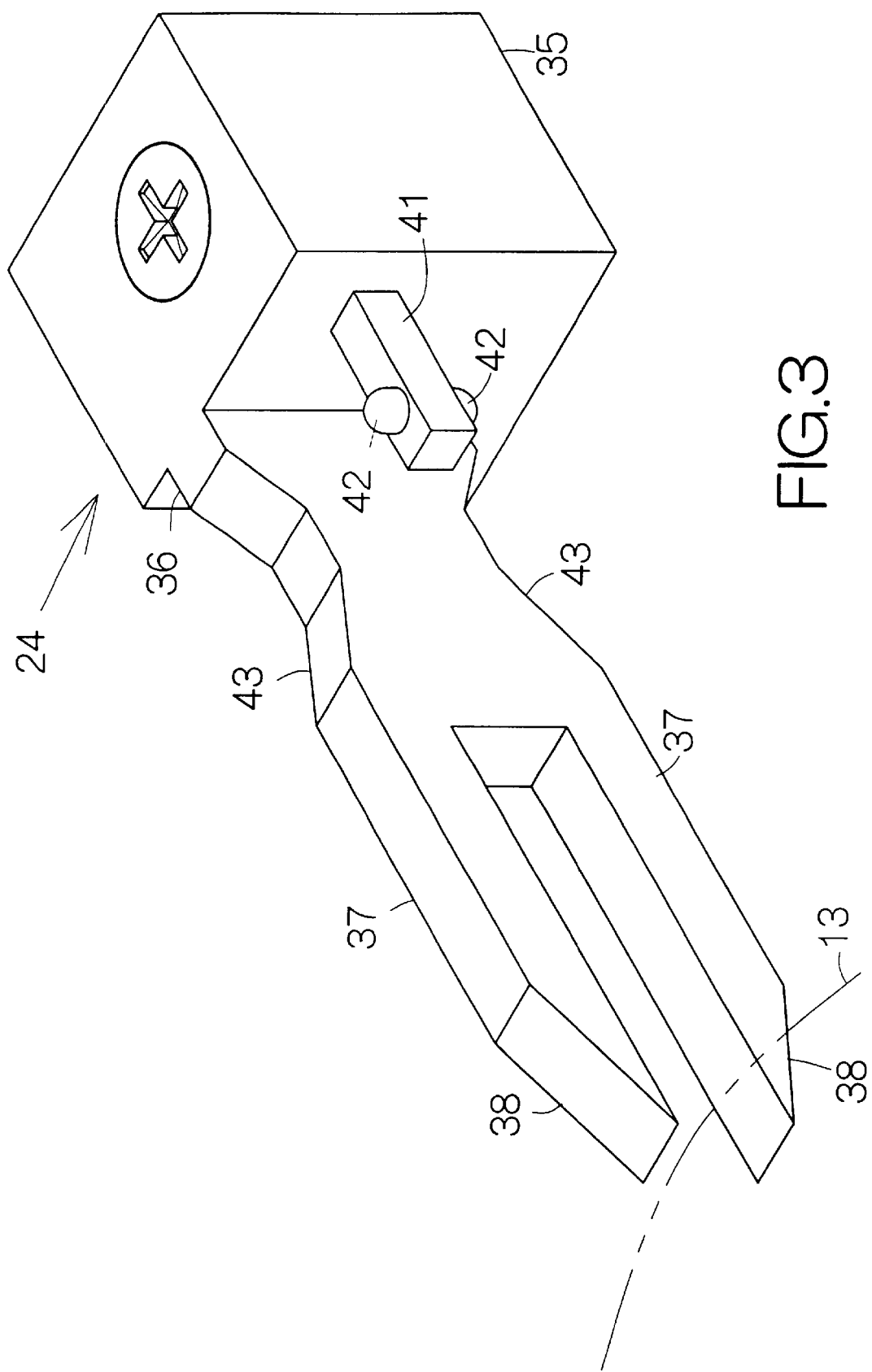
FIG. 3 is an enlarged perspective view schematically illustrating the structure of a ramp member.

As shown in FIG. 3, the ramp member 24 includes a support mount 35 fixedly coupled to the bottom plate of the primary enclosure 12 by a screw, for example, and an arm member 36 extending from the support mount 35 in a horizontal direction toward the rotation axis of the magnetic recording disk 13. A pair of slides 37 are integrally formed on the arm member 36. The respective slides 37 are designed to oppose the opposite sides of the magnetic recording disk 13 at the marginal areas outside the outermost recording track 16, for example. A slant 38 is defined on the individual slide 37. The slant 38 is designed to gradually get distanced away from the surface of the magnetic recording disk 13 as it gets outward in the radial direction of the magnetic recording disk 13.

A suspension holding member 41 is integrally formed on the support mount 35 so as to extend in the horizontal direction. A pair of protrusions 42 are formed on the leading end of the suspension holding member 41. The protrusions 42 are designed to protrude upward and downward, respectively, in the vertical direction. The individual protrusion 42 is located on a path of movement along which the corresponding bore 33 follows when the swinging arm 20 swings around the support shaft 18. The protrusions 42 constitute a connecting mechanism in combination with the corresponding bores 33 of the head suspensions 21. In this case, depressions 43 may be formed on the arm member 36. The depression 43 should be located on an extension of a straight line connecting the support shaft 18 and the protrusion 42 to each other. The ramp member 24 in this manner constitutes a load/unload mechanism in combination with the aforementioned load bar 22. The ramp member 24 may be made of a hard plastic material such as an engineering plastic.

When the magnetic recording disk 13 is driven to rotate in the aforementioned HDD 11, the flying head slider 28 receives an airflow generated along the surface of the rotating magnetic recording disk 13 so as to fly above the surface of the magnetic recording disk 13. During flight of the flying head slider 28, the electromagnetic transducers serve to read and write the magnetic binary data from and into the magnetic recording disk 13. The flying head slider 28 is allowed to move in the radial direction of the magnetic recording disk 13 so as to cross the recording tracks on the magnetic recording disk 13. This radial movement serves to position the electromagnetic transducers right above a target recording track within the data area 17. The swinging movement of the swinging arm 20 is employed to establish the radial movement of the flying head slider 28.

Figure 4:
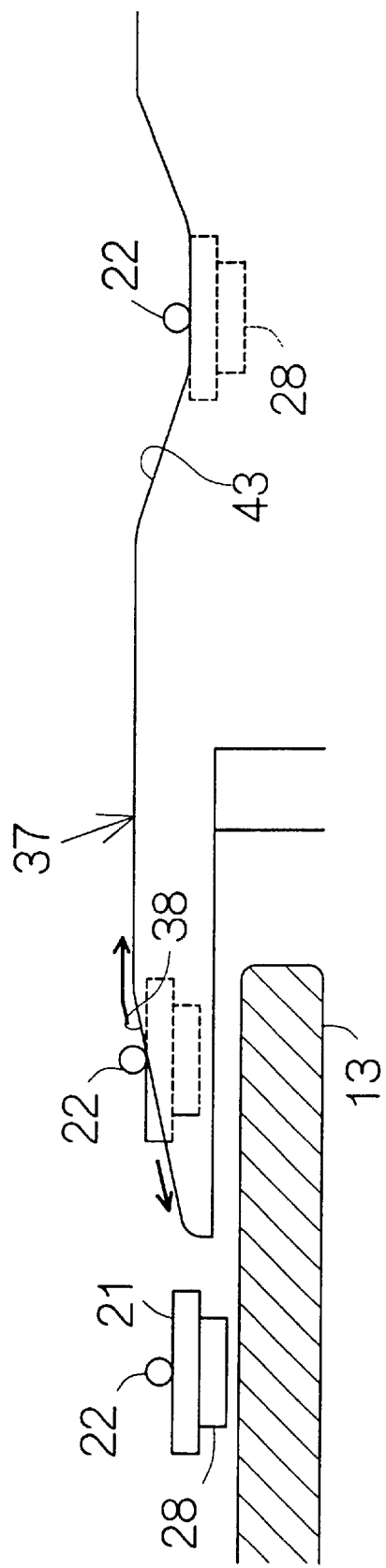
FIG. 4 is an enlarged side view of the ramp member for schematically illustrating the movement of a load bar along a slide.

Now, assume that the rotation of the magnetic recording disk 13 is to be terminated. After the read/write operation has been completed, the actuator 23 drives the swinging arm 20 in a forward direction toward the standby position. When the flying head slider 28 has moved beyond the outermost recording track 16 so as to oppose its bottom surface to the marginal area outside the outermost recording track 16, as shown in FIG. 4, the load bar 22 contacts the slant 38 on the slide 37. When the swinging arm 20 further swings, the load bar 22 is forced to climb up the slant 38. The elastic deformation induced in the flexible section 32 of the head suspension 21 absorbs the reaction of the slant 38 acting on the head suspension 21. As the load bar 22 moves upward along the slant 38, the flying head slider 28 gradually gets distanced from the surface of the magnetic recording disk 13. The load bar 22 is received on the ramp member 24 in this manner.

Figure 5:
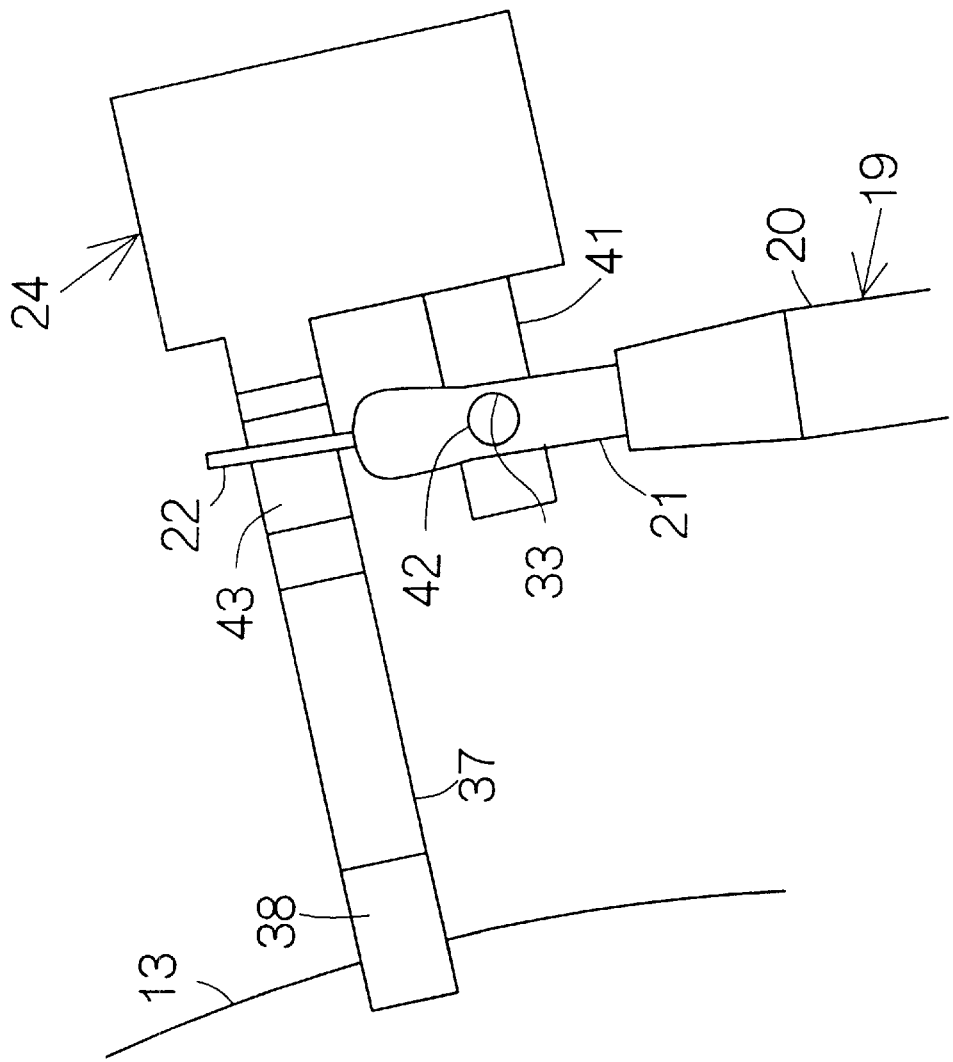
FIG. 5 is an enlarged plan view illustrating a carriage at a standby position.

As shown in FIG. 5, when the swinging arm 20 has reached the standby position, the load bar 22 is received in the depression 43. The high rigidity section 31 of the head suspension 21 is simultaneously connected to the suspension holding member 41. Specifically, the protrusion 42 of the suspension holding member 41 enters the bore 33 defined in the high rigidity section 31. Since the elasticity of the flexible section 32 serves to urge the high rigidity section 31 against the suspension holding member 41, the bore 33 is hardly released from the connection to the protrusion 42. After the swinging arm 20 has completely been positioned at the standby position in this manner, the magnetic recording disk 13 stops rotating. Since the load bar 22 is held on the ramp member 24, the flying head slider 28 can be prevented from contacting or colliding against the surface of the magnetic recording disk 13 irrespective of an airless condition.

In general, when the head suspension 21 is allowed to bend at the flexible section 32, the amplitude of displacement gets larger at a location remoter from the flexible section 32. In other words, the load bar 22 tends to suffer from a larger displacement in response to any impact acting on the HDD 11. To the contrary, the amplitude of displacement gets smaller at a location closer to the flexible section 32. The closer to the flexible section 32 the bore 33 is located, the smaller probability of releasing the bore 33 out of the protrusion 42 can be expected. It is possible to reliably keep the connection between the head suspension 21 and the suspension holding member 41 in this case. If the stable or fixed connection can be established between the head suspension 21 and the suspension holding member 41 in this manner, it is possible to reliably prevent the load bar 22 from falling off from the ramp member 24 even when a hard impact acts on the HDD 11 from the outside.

When the HDD 11 receives instructions for reading and writing a magnetic information data, the magnetic recording disk 13 first starts rotating in the HDD 11. After the rotation of the magnetic recording disk 13 enters the steady state, the actuator 23 serves to drive the swinging arm 20 in a backward direction opposite to the aforementioned forward direction. The elastic deformation of the flexible section 32 causes release of the connection between the head suspension 21 and the suspension holding member 41. As is apparent from FIG. 4, the load bar 22 starts to move out of the depression 43 toward the slant 38. When the swinging arm 20 further swings, the load bar 22 is allowed to move downward along the slant 38.

During the downward movement of the load bar 22 along the slant 38, the flying head slider 28 is allowed to oppose its bottom surface to the surface of the magnetic recording disk 13. An airflow generated along the surface of the rotating magnetic recording disk 13 acts on the flying head slider 28 so as to generate a lift of the flying head slider 28. Subsequently, when the swinging arm 20 further swings, the load bar 22 is forced to take off the slant 38, namely, the ramp member 24. Since the magnetic recording disk 13 rotates in the steady state, the flying head slider 28 keeps flying above the surface of the magnetic recording disk 13 without support of the ramp member 24.

In the above-described load/unload mechanism, the bore 33 may be defined in the suspension holding member 41 while the protrusion 42 may be formed on the head suspension 21. In addition, the connecting mechanism may employ a combination of a protrusion or swell and a dimple or the like in place of the aforementioned bore 33 and protrusion 42. As long as the connection can be established between the head suspension 21 and the suspension holding member 41, the aforementioned depression 43 can be eliminated from the arm member 36.

Figure 6:
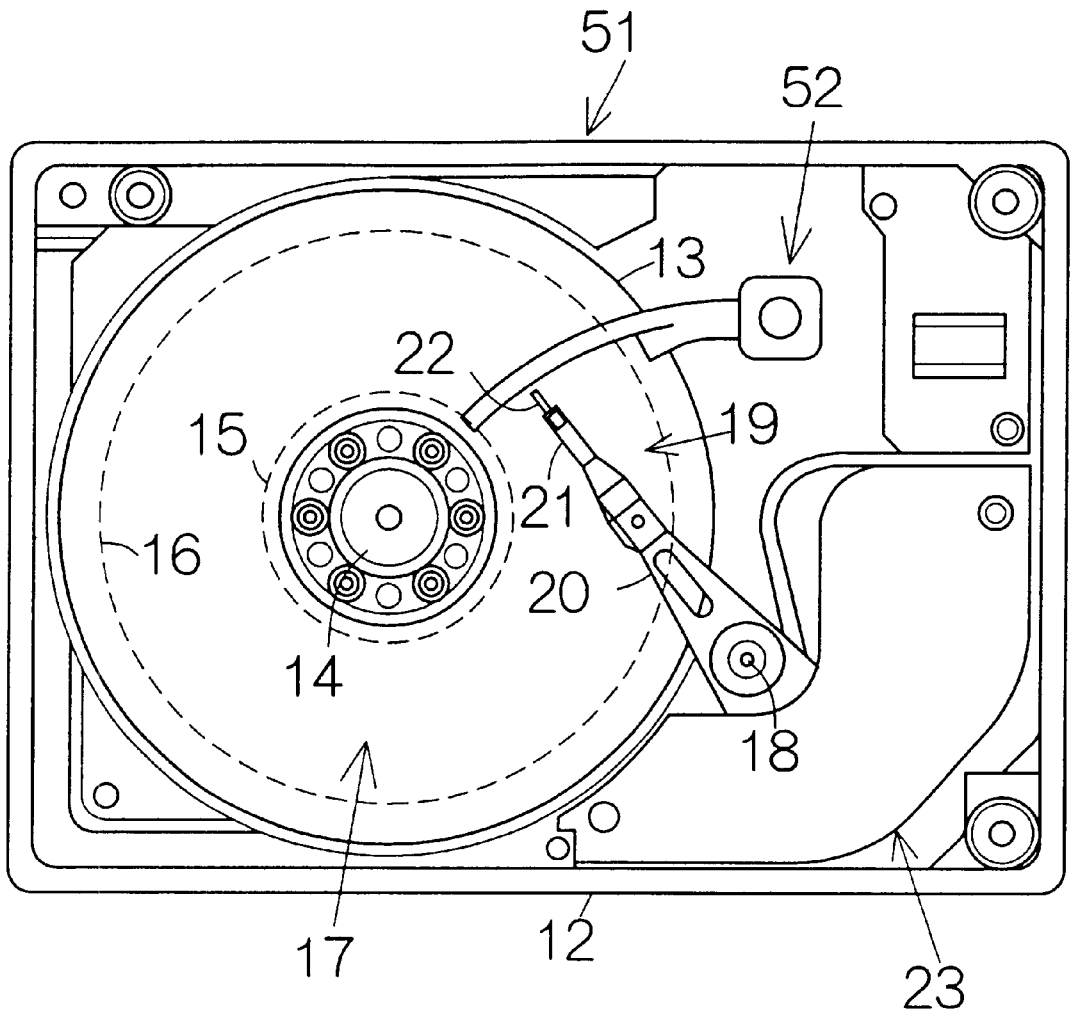
FIG. 6 is a plan view schematically illustrating the inner structure of a hard disk drive (HDD) according to a second embodiment of the present invention.

FIG. 6 schematically illustrates the inner structure of a hard disk drive (HDD) 51 as an example of the recording disk drive according to a second embodiment of the present invention. The HDD 51 of this type includes a ramp member 52 extending in the radial direction of the magnetic recording disk 13 so as to cross the data area 17 over the surface of the magnetic recording disk 13. Like reference numerals are attached to the structure identical or equivalent to those in the aforementioned first embodiment, so that avoid any duplicate description is omitted.

Figure 7:
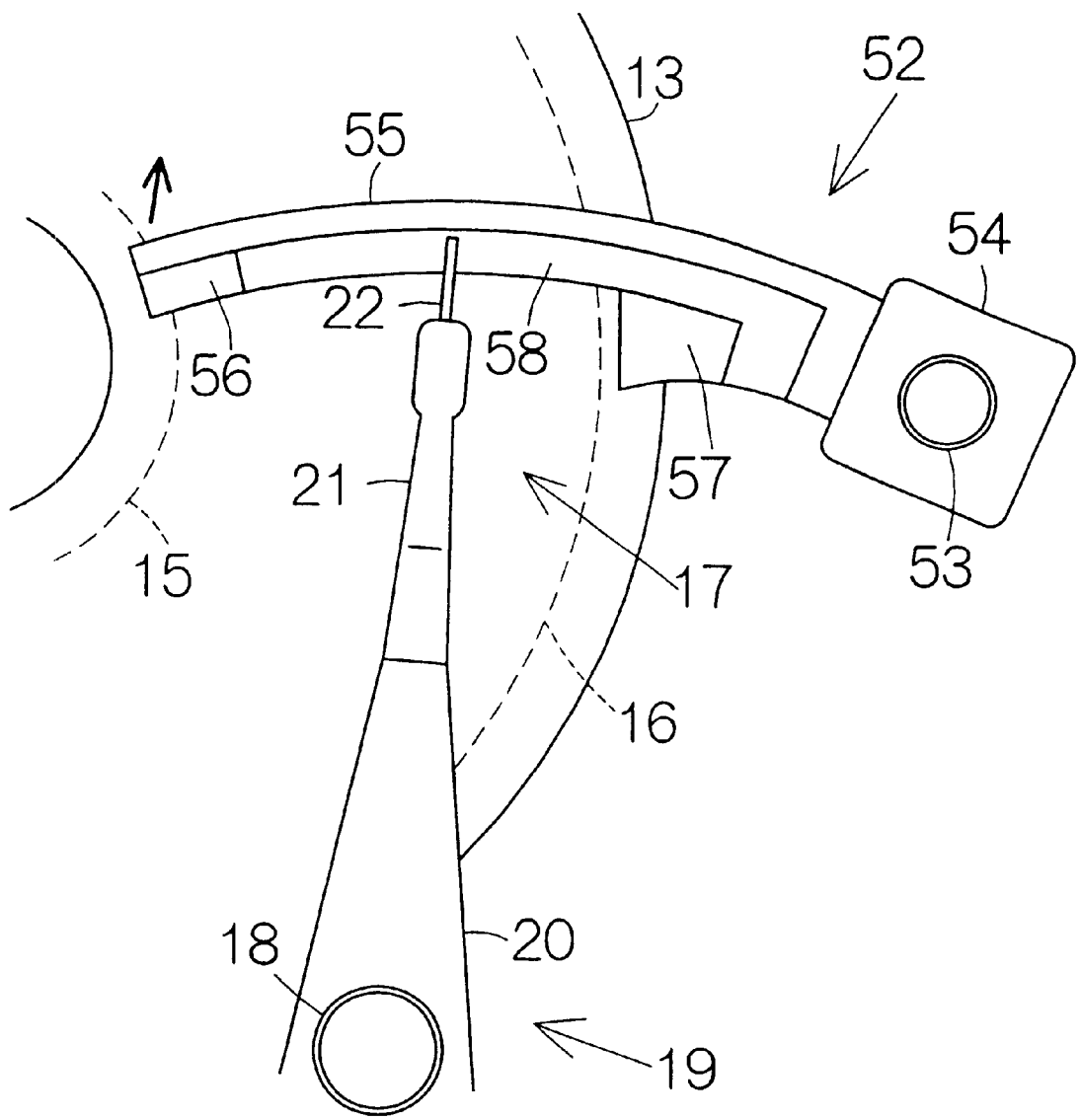
FIG. 7 is an enlarged partial plan view of the HDD for schematically illustrating a ramp body at a first position.

As is apparent from FIG. 7, the ramp member 52 includes a rotary support mount 54 mounted on a vertical support shaft 53, and a ramp body 55 extending from the support mount 54 so as to oppose its tip end to at least the innermost recording track 15. An inner slant 56 is defined on the ramp body 52 so as to receive the load bar 22 when the flying head slider 28 takes an innermost effective flying position. An outer slant 57 is also defined on the ramp member so as to receive the load bar 22 when the flying head slider 28 takes an outermost effective flying position. The inner and outer slants 56, 57 are designed to gradually get distanced away from the surface of the magnetic recording disk 13 as they gets outward in the radial direction of the magnetic recording disk 13. When the rotary support mount 54 rotates around the vertical support shaft 53, the ramp body 55 is allowed to swing between a first position and a second position. The inner slant 56 can be positioned on a path of movement of the load bar 22 when the ramp body 55 takes the first position. On the other hand, the outer slant 57 can be positioned on the path of movement of the load bar 22 when the ramp body 55 takes the second position. In this case, the inner slant 56 is forced to get out of the path of movement of the load bar 22 and the carriage 19 when the ramp body 55 takes the second position. The flying head slider 28 at the innermost effective flying position is designed to oppose its bottom surface to the marginal area inside the innermost recording track 15. The flying head slider 28 at the outermost effective flying position is designed to oppose its bottom surface to the marginal area outside the outermost recording track 16.

The outer end of the outer slant 57 is connected to the outer end of the inner slant 56 through a guide passage 58. The guide passage 58 is designed to guide the load bar 22 received at the outer slant 57 toward the inner slant 56. The guide passage 58 may extend along an arc whose center is set at the support shaft 18, for example. As is apparent from FIG. 7, when the ramp body 55 is positioned at the first position, the path of movement of the load bar 22 is superposed on the guide passage 58.

Figure 8:
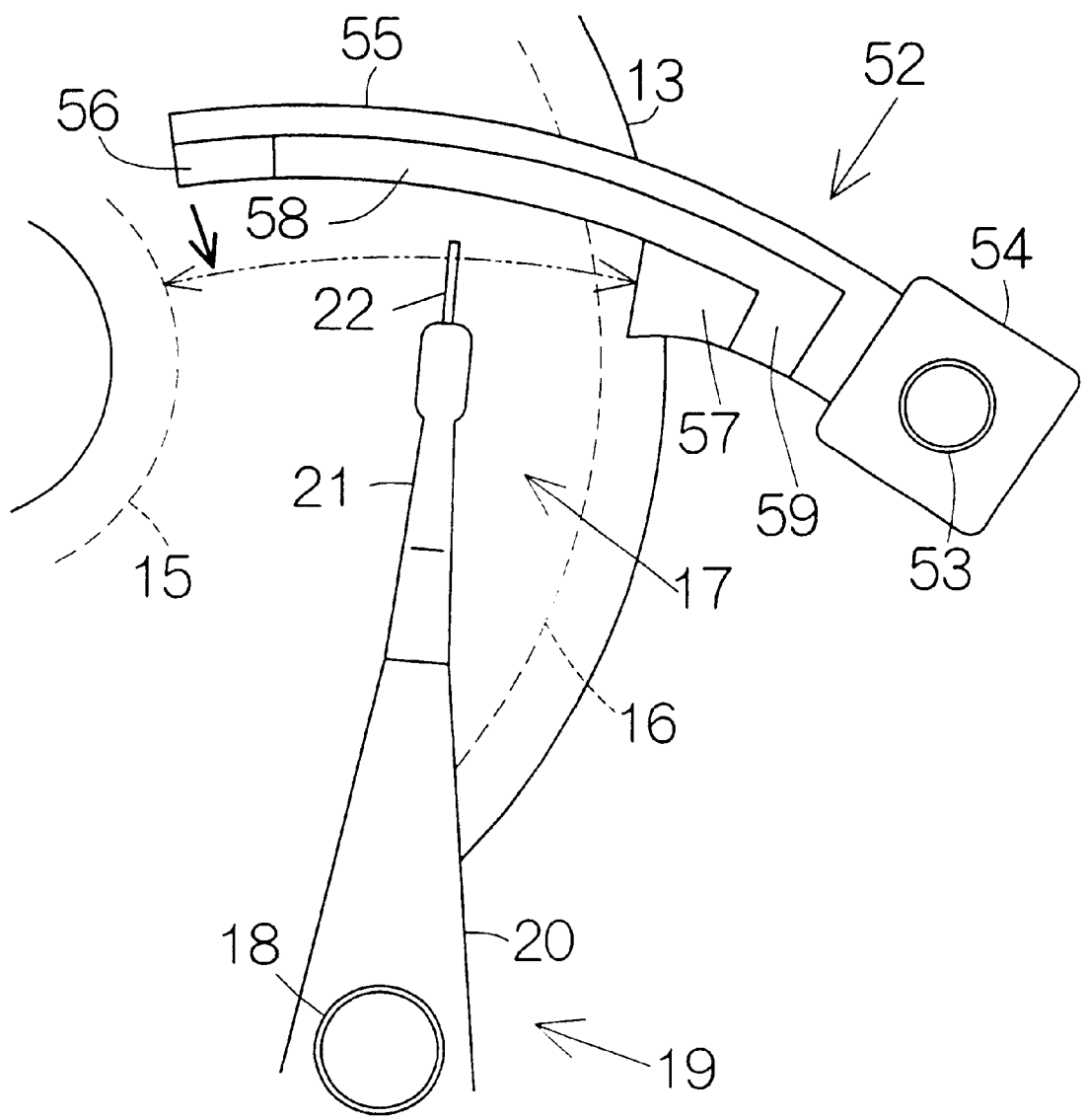
FIG. 8 is an enlarged partial plan view of the HDD for schematically illustrating the ramp body at a second position.

As shown in FIG. 8, the ramp body 55 is positioned at the second position during rotation of the magnetic recording disk 13 in the HDD 51. The inner slant 56 and the guide passage 58 are forced to get out of the path of movement of the load bar 22 and the carriage 19. Specifically, the ramp body 55 is located completely off the path of movement of the load bar 22 above the data area 17 over the magnetic recording disk 13. Any contact or collision can be prevented between the load bar 22 and the ramp body 55 when the electromagnetic transducers on the flying head slider 28 is to be positioned right above a target recording track. The outer slant 57 stands by on the path of movement of the load bar 22 outside the outermost recording track 16.

Now, assume that the magnetic recording disk 13 is intended to stop rotating. After the read/write operation has been completed, the actuator 23 drives the swinging arm 20 in the forward direction. When the flying head slider 28 then moves beyond the outermost recording track 16 so as to oppose the bottom surface to the marginal area, the load bar 22 contacts the outer slant 57 on the ramp body 55, as shown in FIG. 8. A further swinging movement of the swinging arm 20 allows the load bar 22 to climb up the outer slant 57. The load bar 22 can be received on the ramp member 52 in this manner. When the swinging arm 20 has been set at the standby position, the load bar 22 reaches an entrance 59 of the guide passage 58.

Subsequently, the magnetic recording disk 13 stops rotating. The ramp body 55 returns to the first position. As mentioned above, the path of movement of the load bar 22 is superposed on the guide passage 58 on the ramp body 55 at the first position. Even when the swinging arm 20 involuntarily swings in response to a hard impact acting on the HDD 51, the load bar 22 is reliably prevented from falling off from the guide passage 58 on the ramp member 52. It is possible to reliably prevent the flying head slider 28 from contacting or colliding against the magnetic recording disk 13 which stands still.

Figure 9:
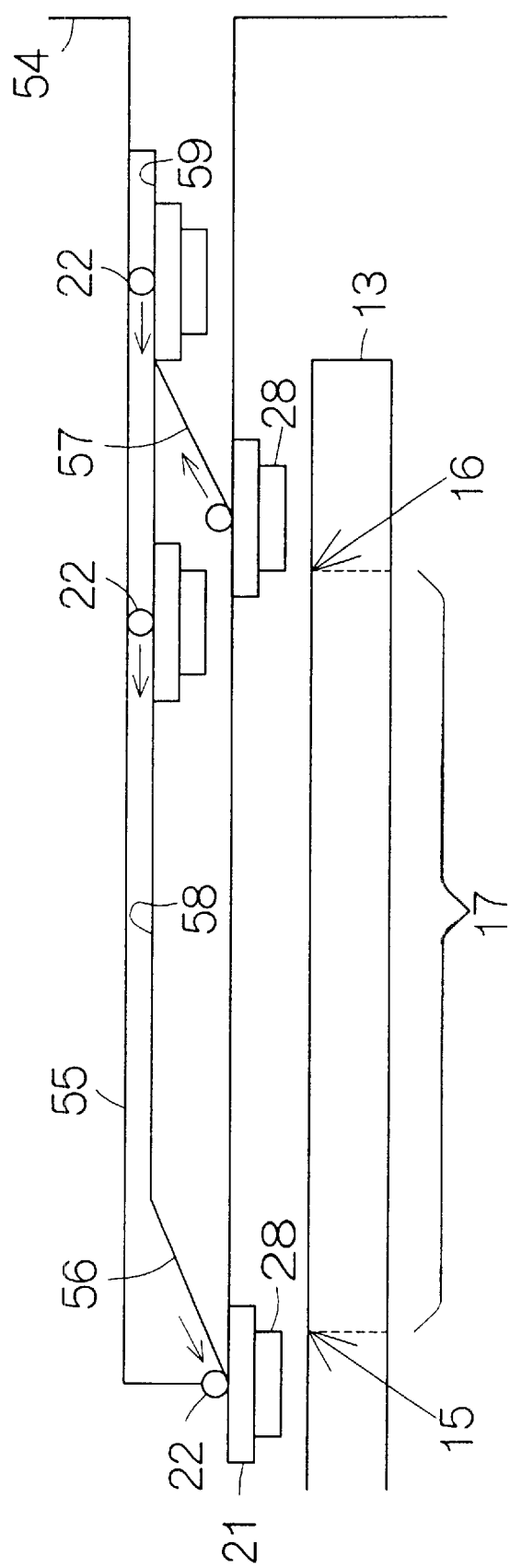
FIG. 9 is a schematic view illustrating the movement of a load bar on the ramp member.

When the HDD 51 receives instructions for the read/write operation, the magnetic recording disk 13 first starts rotating in the HDD 51. Simultaneously, the actuator 23 serves to drive the swinging arm 20 in a backward direction opposite to the aforementioned forward direction. Since the ramp body 55 is maintained at the first position, the load bar 22 is allowed to trace the guide passage 58 until it reaches the inner slant 56, as shown in FIG. 9.

When the swinging arm 20 further swings, the load bar 22 moves downward along the inner slant 56. The flying head slider 28 opposes its bottom surface to the marginal area inside the innermost recording track 15. An airflow generated along the surface of the magnetic recording disk 13 serves to generate a lift of the flying head slider 28. Thereafter, when the swinging arm 20 further swings, the load bar 22 is forced to take off the inner slant 56, namely, the ramp member 52. Since the magnetic recording disk 13 rotates in the steady state, the flying head slider 28 keeps flying above the surface of the magnetic recording disk 13 without support of the ramp member 52. After the load bar 22 has taken off the ramp member 52 in this manner, the ramp member 52 is shifted to the second position.

In general, a marginal area, not applicable to recordation of data, is preferably defined on the surface of a magnetic recording disk below a specific position at which a flying head slider takes off a ramp member in a load/unload mechanism in an HDD, since there is a probability in which the flying head slider involuntarily collides against the surface of the magnetic recording disk after taking of f the ramp member. The collision may induce a damage on the flying head slider, and/or generation of a scar or loss of a recorded information on the magnetic recording disk. In the case where the flying head slider takes off at a specific position outside the outermost recording track in a conventional manner, the marginal area of a predetermined width should be defined outside the outermost recording track.

As conventionally known, a longer recording track can be defined on the surface of the magnetic recording disk 13 at an outer position rather than at an inner position. In other words, a larger quantity of data can be recorded on the magnetic recording disk 13 along an outer recording track rather than an inner recording track. Since the HDD 51 of the aforementioned type allows the flying head slider 28 to take off the ramp member 52 at a position inside the innermost recording track 15, the marginal area of a predetermined width should be defined inside the innermost recording track 15. It is not necessary to define a marginal area of the predetermine width outside the outermost recording track 16 in a conventional manner. Specifically, it is possible to reduce the marginal area, not applicable to recordation of data, as compared with the case where the marginal area should be defined outside the outermost recording track 16. Accordingly, a limited area over the magnetic recording disk 13 can be utilized in an efficient manner.

In the aforementioned load/unload mechanism, a driving mechanism, not shown, interlocked with the swinging movement of the swinging arm 20, can be employed to realize the swinging movement of the ramp body 55 around the vertical support shaft 53. Such a driving mechanism is preferably designed to hold the ramp body 55 at the second position when the flying head slider 28 is allowed to fly above the data area 17 over the surface of the magnetic recording disk 13. When the swinging arm 20 has reached the standby position, the driving mechanism is designed to bring the ramp body 55 to the first position. Subsequently, the driving mechanism serves to drive the ramp body 55 to the second position when the swinging arm 20 has reached the innermost position after the swinging movement in the backward direction. The motion in this manner is repeated. A cam mechanism maybe employed to establish the driving mechanism, for example.

Figure 10:
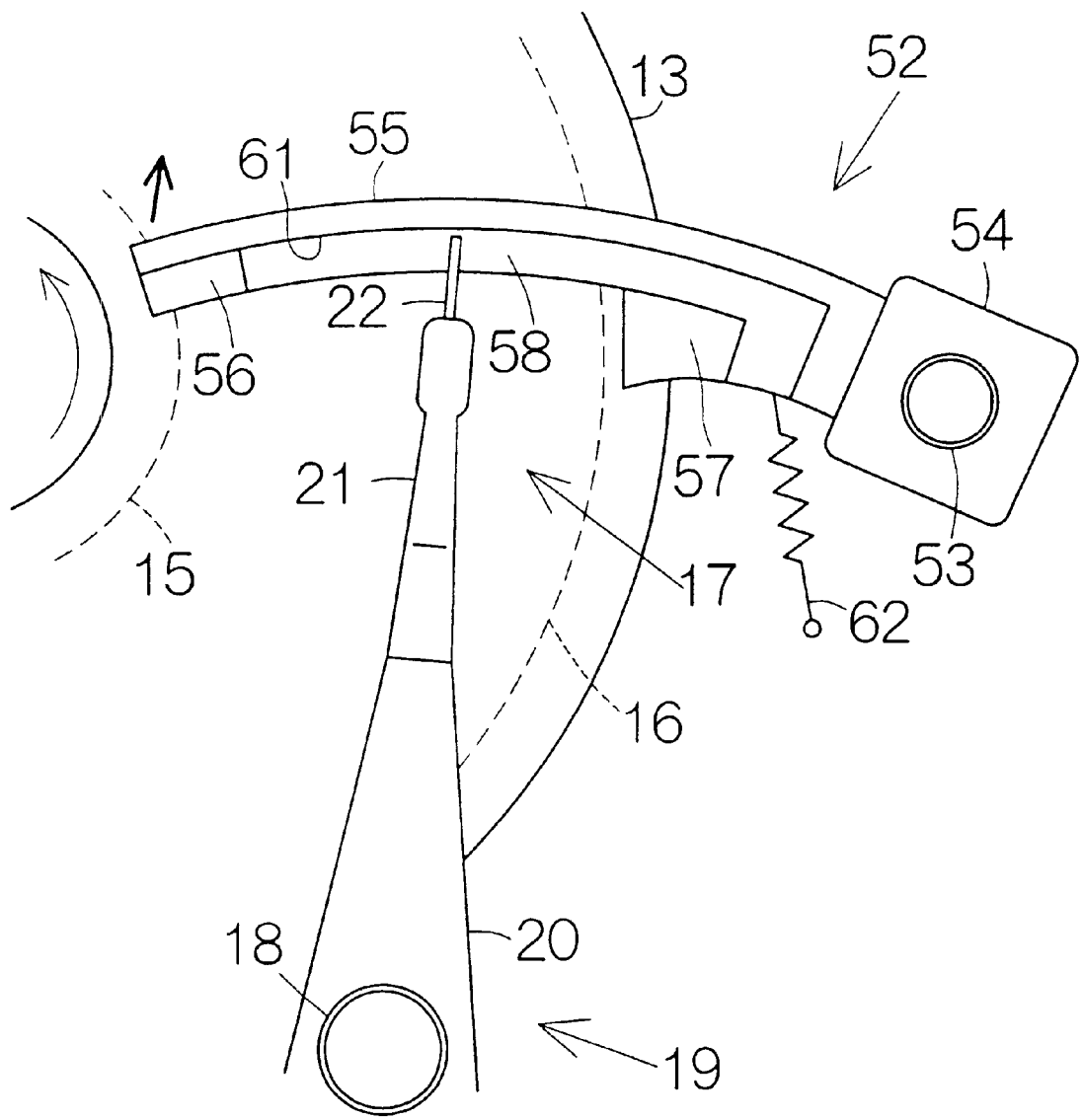
FIG. 10 is an enlarged plan view of the HDD for schematically illustrating the structure of a driving mechanism for the ramp member.

Alternatively, a driving mechanism may employ an airflow generated along the surface of the magnetic recording disk 13 so as to realize the swinging movement of the ramp body 55 around the vertical support shaft 53. The driving mechanism may include a blowy wall 61 formed on the ramp body 55 so as to receive the airflow during rotation of the magnetic recording disk 13, and a biasing member 62 such as a spring designed to bias the ramp body 55 toward the first position, as shown in FIG. 10, for example. The biasing force of the biasing member 62 serves to maintain the ramp body 55 at the first position until the rotational speed of the magnetic recording disk 13 reaches the steady state, namely, the set maximum speed.

During rotation of the magnetic recording disk 13, the blowy wall 61 of the ramp body 55 receives the airflow generated along the surface of the rotating magnetic recording disk 13. The airflow generates a driving force to drive the ramp body 55 toward the second position from the first position. When the magnetic recording disk 13 enters the steady state, the driving force acting on the blowy wall 61 overcomes the biasing force of the biasing member 62. The ramp body 55 can thus be kept at the second position against the biasing force from the biasing member 62.

On the other hand, when the rotational speed of the magnetic recording disk 13 drops below the maximum speed, the driving force acting on the blowy wall 61 decreases. The biasing force from the biasing member 62 overcomes the driving force acting on the blowy wall 61. As a result, the ramp body 55 is forced to return to the first position from the second position with the assistance of the biasing member 62.

What is claimed is:

1. A recording disk drive comprising:
    a recording disk rotating around a rotational axis;
    a head slider supporting a head element and designed to move across the recording disk in a radial direction thereof;
    a head suspension supporting the head slider;
    a swinging arm supporting the head suspension and designed to cause the head slider to move in the radial direction of the recording disk;
    a ramp member extending in the radial direction of the recording disk so as to cross a data area on the recording disk;
    an inner slant defined on the ramp member and designed to receive a load bar carried on the head suspension when the head slider takes an innermost effective flying position; and
    an outer slant defined on the ramp member and designed to receive the load bar when the head slider takes an outermost effective flying position,
    wherein said ramp member swings around a support shaft between a first position allowing the inner slant to receive the load bar and a second position allowing the outer slant to receive the load bar.

2. The recording disk drive according to claim 1, further comprising:
    a biasing member connected to the ramp member so as to bias the ramp member toward the first position; and
    a blowy member designed to receive an airflow induced by a rotation of the recording disk so as to generate a driving force to drive the ramp member toward the second position against a biasing force of the biasing member.

* * * * *